(12) United States Patent
Dziech

(10) Patent No.: US 6,894,492 B1
(45) Date of Patent: May 17, 2005

(54) SELF-ALIGNING PROBE AND ITS USE

(75) Inventor: Michael Leonard Dziech, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 10/011,191

(22) Filed: Dec. 7, 2001

(51) Int. Cl.$^7$ .................. G01R 33/12; G01N 27/82
(52) U.S. Cl. .................. 324/238; 324/240; 324/262; 33/501.04
(58) Field of Search .................. 324/229–230, 324/238–242, 260–262, 248, 225; 702/38; 33/501.04, 501.5

(56) References Cited

U.S. PATENT DOCUMENTS

| | | | | |
|---|---|---|---|---|
| 4,041,378 A | * | 8/1977 | Ott | 324/262 |
| 4,051,430 A | * | 9/1977 | Millette et al. | 324/260 |
| 4,101,832 A | * | 7/1978 | Baker et al. | 324/227 |
| 4,618,825 A | * | 10/1986 | Fischer | 324/230 |
| 4,683,430 A | | 7/1987 | Harris et al. | 324/241 |
| 4,779,352 A | * | 10/1988 | Lang | 33/834 |
| 4,916,394 A | * | 4/1990 | Thompson | 324/262 |
| 5,207,005 A | * | 5/1993 | Amos et al. | 33/501.04 |
| 5,291,136 A | * | 3/1994 | Van der Veer et al. | 324/262 |
| 5,444,372 A | * | 8/1995 | Wikswo et al. | 324/248 |
| 5,544,953 A | | 8/1996 | Viertl | 374/164 |
| 5,600,240 A | * | 2/1997 | Mikhailovich et al. | 324/219 |
| 5,801,532 A | * | 9/1998 | Patton et al. | 324/238 |
| 5,841,277 A | * | 11/1998 | Hedengren et al. | 324/240 |
| 5,986,452 A | * | 11/1999 | Hockey et al. | 324/240 |
| 6,011,391 A | * | 1/2000 | Nix et al. | 324/230 |
| 6,040,695 A | * | 3/2000 | Raulerson et al. | 324/240 |
| 6,288,537 B1 | * | 9/2001 | Viertl et al. | 324/230 |
| 6,351,120 B2 | * | 2/2002 | Goldfine | 324/262 |

* cited by examiner

*Primary Examiner*—N. Le
*Assistant Examiner*—Darrell Kinder
(74) *Attorney, Agent, or Firm*—Gregory O. Garmong; Carmen Santa Maria; McNees Wallace & Nurick LLC

(57) ABSTRACT

A sensor measurement of an article having an article surface shape is performed using a hand-held senor probe having a probe housing, a sensor support rotatably mounted in the probe housing and having an orienting structure defined thereon. The orienting structure is preferably an orienting face with substantially the article surface shape. A sensor, such as a eddy current sensor, is affixed to the sensor support and is operable through the orienting face of the sensor support. The orienting face of the sensor support is pressed against the article surface to orient the sensor support and thence the sensor relative to the article surface, and the sensor measurement is performed. The sensor is preferably a ball having the orienting face thereon, and mounted to the probe housing in a ball-and-socket relationship.

22 Claims, 3 Drawing Sheets

SELF-ALIGNING PROBE AND ITS USE

This invention relates to a sensor probe and its use, and more particularly to a hand-held sensor probe that self aligns when pressed against a surface of an article to be measured.

BACKGROUND OF THE INVENTION

In eddy current and some other types of testing, a sensor probe is contacted to a surface of an article to be tested. A sensor contained within the probe performs the test sensing while the probe is contacted to the surface. The data collected is used to assess the structural nature of the article. In one application of particular interest, eddy current measurements are used to assess whether small cracks, microstructural irregularities, and/or other types of irregularities are present in the article, which could lead to premature failure of the article.

Relatively small, hand-held sensor probes are conveniently employed to study irregularly shaped articles, for quick looks at articles, or in field situations where a larger apparatus cannot be readily provided. When a hand-held sensor probe is used, great care must be taken so that the sensor probe is positioned precisely relative to the surface of the article. Mispositioning may lead to attenuation of the signal that is to be measured by the sensor and/or to erroneous readings.

The operator of the sensor probe must maintain the proper positioning. One approach is to use fixturing to hold the sensor probe in the correct position relative to the article surface. The fixturing is time-consuming to set up, and in most cases is not compatible with the sensing of highly irregular articles, quick studies, and many field situations. In current practice, then, the usual approach is to scan the hand-held sensor probe over the surface many times while watching an indicator of the sensor data, until a judgment is made that sufficient sensor data of acceptable quality has been obtained. There are sometimes problems in knowing when a sufficient amount of information has been gathered, and knowing whether the information is accurate. The process of data taking is therefore dependent upon the skill and state of mind of the operator.

There is therefore a need for an approach to facilitate the taking of data using sensor probes that contact the surface of an article. The present invention fulfills this need, and further provides related advantages.

SUMMARY OF THE INVENTION

The present invention provides a sensor probe that is particularly useful in a hand-held version, and a method for its use. The sensor probe achieves good, reproducible contact of the sensor probe to the surface of the article being measured. The result is that the data taken is reproducible and largely free of operator-based variables that may otherwise result in degradation of the data. The approach is usable with a variety of types of sensor probes.

A sensor probe oriented in relation to an article surface comprises a probe housing, and a sensor support rotatably mounted in the probe housing and having an orienting structure defined thereon. The orienting structure may be, for example, a planar or curved orienting face, or other orienting structure such as a notch. The orienting structure orients the sensor support relative to the article surface responsive to a contact pressure between the orienting structure and the article surface. A sensor is affixed to the sensor support and oriented relative to the article surface responsive to the orienting structure.

In one embodiment, a sensor probe comprises a probe housing, a sensor support rotatably mounted in the probe housing and having an orienting face defined thereon, and a sensor affixed to the sensor support and operable through the orienting face of the sensor support.

The probe housing typically is cylindrical with a probe housing axis and of a size sufficiently small to be held in the hand of a person. The sensor support is preferably rotatable about at least a first rotation axis, and preferably also a second rotation axis, each of which is perpendicular to the probe housing axis. This structure may be implemented by making the sensor support a segment of a sphere having the orienting structure thereon. The spherical-segment sensor support is preferably mounted in the probe housing in a ball-and-socket relationship. The orienting face may be planar for the case where the surface to be inspected is planar, or it may be curved to match the shape of an irregularly shaped or curved surface, or it may be part of another feature such as a notch. In some cases, it will be known in advance that the surface is curved with a known shaped, and the orienting face may be provided with that same curvature. The orienting face may be within a notch or other recess of the orienting structure. The sensor may be of any operable type, but is preferably an eddy current sensor.

A method for performing a sensor measurement of an article having an article surface with an article surface shape includes providing a hand-held sensor probe comprising a probe housing, a sensor support rotatably mounted in the probe housing and having an orienting structure thereon, the orienting structure conforming to the article surface shape, and a sensor affixed to the sensor support and operable through the orienting structure of the sensor support. Other features of the sensor probe as discussed above may be used in relation to the method. The method further includes pressing the orienting face of the sensor support against the article surface, typically but not necessarily by hand, and performing the sensor measurement.

In this approach, the sensor support angularly floats in the probe housing. The orienting structure, usually in the form of an orienting face, is pressed against the surface of the article to be measured to maintain an intimate contact therewith. The sensor probe is then moved across the surface in a sliding fashion or stepwise fashion. If the angle of the probe housing axis of the sensor probe to the surface varies due to a change in the angle of the surface or due to the manner in which the operator moves the sensor probe, the sensor support adjusts to that angular variation responsive to the orienting structure as the orienting structure maintains its intimate contact to the surface. Consequently, the sensor affixed to the sensor support, and contained within the ball-shaped sensor support in the case where it is a segment of a sphere, maintains a constant, fixed angular and distance relationship to the surface of the article. The result is that the sensor measurements are well defined and reproducible. The effects of surface shape and the state of mind of the operator are minimized.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
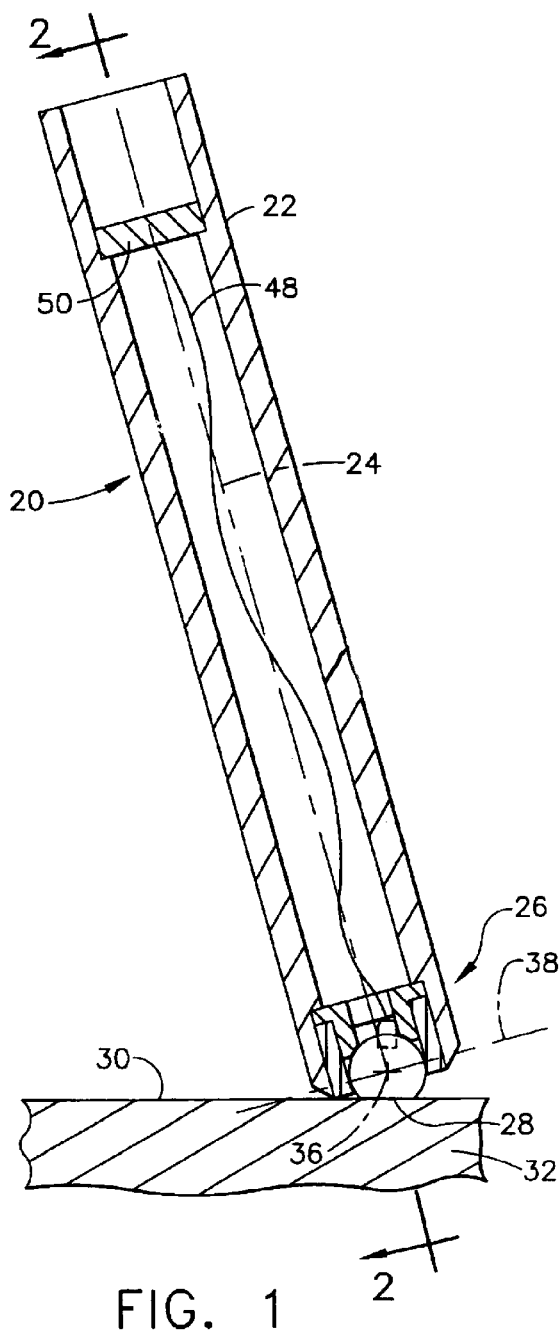
FIG. 1 is a sectional view of a sensor probe.
Figure 2:
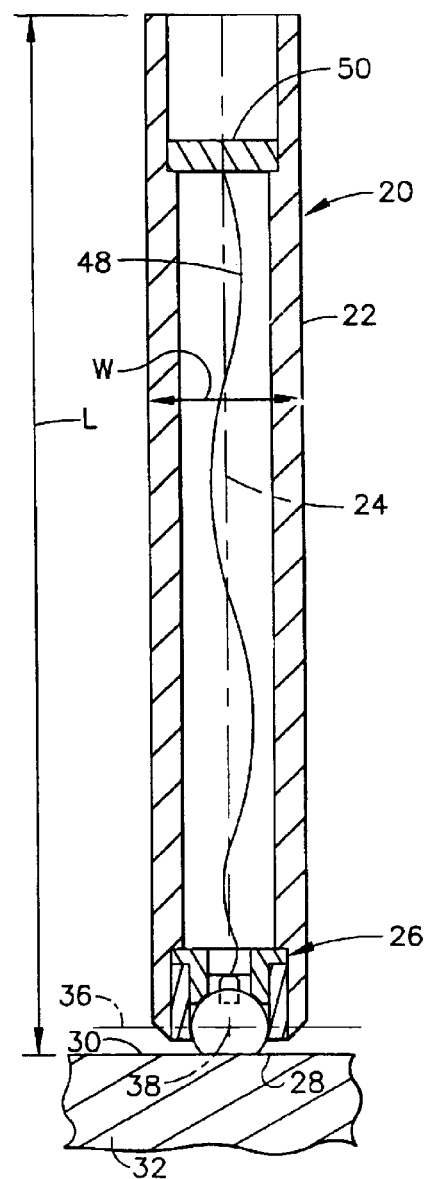
FIG. 2 is a sectional view of the sensor probe of FIG. 1, taken on line 2—2.

FIGS. 1–2 depict a sensor probe 20. The sensor probe 20 includes a probe housing 22, which in this case is substantially cylindrical with a probe housing axis 24 coincident with a cylindrical axis of the probe housing 22. The probe housing 22 has a length L and a width W, which in the case of the cylindrical probe housing 22 is a diameter of the probe housing. For a hand-held sensor probe 20 and probe housing 22, typical dimensions are L of about 3.5 inches and W of about 0.5 inches, so that the probe housing 22 is readily held in one hand of a person, although the invention is not so limited. The present invention may be applied to a wide variety of sensor probes, but it is most advantageously applied to a hand-held sensor probe where no support fixturing is used and where the accuracy of the alignment of the sensor to the article being measured otherwise depends upon the state of mind and skill of the operator.

A sensor support 26 is rotatably mounted in the probe housing 22. The sensor support 26 has an orienting structure, in this case an orienting face 28, defined thereon. The orienting face 28 contacts to a surface 30 of an article 32 that is to be measured by the sensor probe 20. The sensor support 26 is rotatable about at least a first rotation axis 36 perpendicular to the probe housing axis 24, and preferably is further rotatable about a second rotation axis 38 perpendicular to the probe housing axis 24. The orienting structure may be such a physical face. The orienting structure may instead be other structure which defines a face, such as a series of point contacts all of which lie on a surface in space that is the orienting face 28. The use of a physical face such as the orienting face 28 is preferred.

Figure 3:
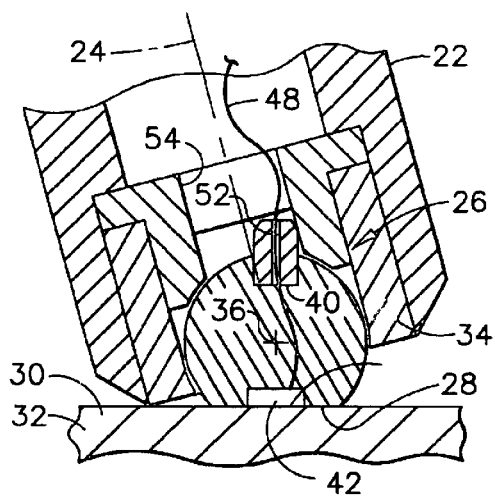
FIG. 3 is a detail of the sensor support, where the orienting face is flat.

Most conveniently, the sensor support 26 comprises a segment of a sphere having the orienting face 28 thereon. A "segment of a sphere" as used herein is a portion of a sphere that encompasses over half of the solid angle subtended by the sphere and thence over half of the periphery of the sphere. Thus, as illustrated in greater detail in FIGS. 3–4, the preferred sensor support 26 is a segment or portion of a sphere with the orienting face 28 thereon. In FIG. 3 the orienting face 28 is a planar surface, and in FIG. 4 the orienting face 28 is a nonplanar, curved surface whose curvature is selected to match that of the surface 30 of the article 32. In either case, when the orienting face 28 of the sensor probe 20 is pressed against the article surface 30 with a contact pressure applied generally parallel to the probe housing axis 24, the sensor support 26 reorients responsively as necessary so that the orienting face 28 remains in intimate contact with the article surface 30.

In this embodiment wherein the sensor support 26 is a segment of a sphere, the sensor support 26 is mounted to a socket 34 in the probe housing 22 in a ball-and-socket relationship. The socket 34 allows the sensor support 26 to pivot in all directions perpendicular to the probe housing axis 24, including the rotation axes 36 and 38. A stop 40 is affixed to the sensor support 26 to engage the socket 34 and thereby prevent the sensor support 26 from rotating too far in any direction. The amount of rotation need not be larger than about 20 degrees for most applications, inasmuch as the operator of the sensor probe 26 is normally able to maintain the sensor probe 26 within that angular range.

Figure 4:
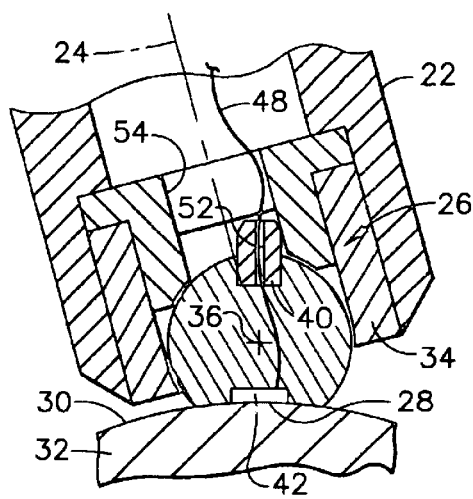
FIG. 4 is a detail of the sensor support as in FIG. 3, where the orienting face is curved.
Figure 5:
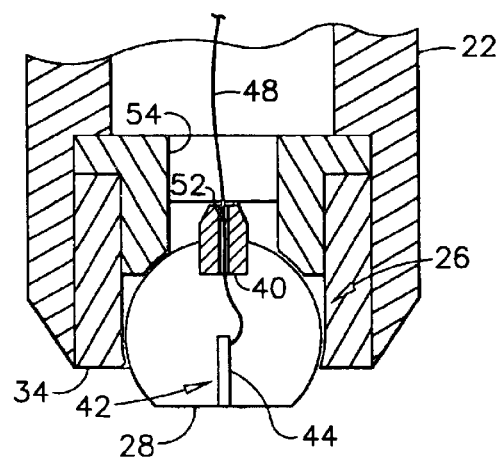
FIG. 5 is a detail of the sensor support as in FIG. 3, illustrating a first eddy current coil form.
Figure 6:
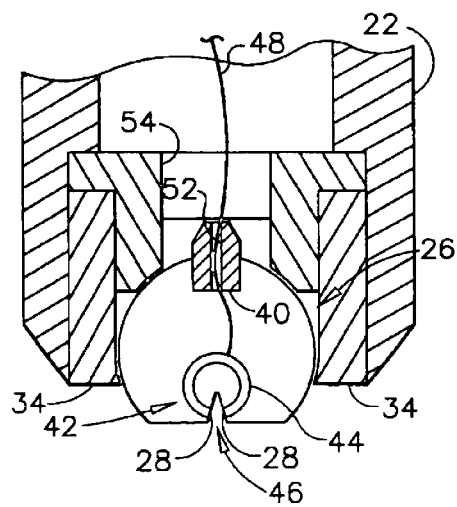
FIG. 6 is a detail of the sensor support as in FIG. 3, illustrating a second eddy current coil form, wherein the orienting face is contained within a notch.

A sensor 42 is affixed to the sensor support 26 and is operable through the orienting face 28 of the sensor support 26. The sensor 42 is normally located within the sensor support 26 and adjacent to the orienting face 28. In the application of most interest to the inventors, the sensor 42 is an eddy current sensor, specifically an eddy current sensor coil 44 as seen in FIGS. 5–6. The eddy current sensor coil 44 may be of any operable type, such as a planar coil shown in FIG. 5 or a half-toroidal coil shown in FIG. 6. The orienting face 28 may be of any operable shape. Flat and curved shapes suitable for inspection of flat and curved surfaces are illustrated in FIGS. 3–4, respectively.

The embodiment of FIG. 6 includes a notch 46 in the spherical-segment sensor support 26. The orienting faces 28 are the included surfaces of the notch 46. This sensor probe 26 is particularly useful in inspecting edges of articles such as the edges of gas turbine blades, vanes, or seal teeth. For example, to inspect the leading or trailing edge of a blade (turbine, compressor, or fan) or turbine vane used in a gas turbine engine, an included angle of the notch 46 is made just slightly larger than an included angle of the leading or trailing edge. The notch 46 is placed over the edge so that the edge lies within the notch, with the sensor coil 44 facing the edge of the blade through the orienting face 28. The operator slides the sensor probe 20 along the edge while keeping the edge within the notch. Sensor measurements are continuously taken as the sensor probe 20 slides along the edge. The leading and trailing edges of gas turbine blades are complexly curved, and the angularly floating nature of the sensor support 26 maintains the intimate contact between the orienting faces 28 (and thence the sensor 44) and the edge being inspected as the sensor probe 20 slides along the edge.

Electrical leads 48 extend from the sensor 42 to an external connector 50 at the opposite end of the probe housing 22. The external connector 50 connects to electronic processing apparatus (not Shown) external to the sensor probe 20 and appropriate for the type of sensor 42. Equivalently, all or some of the electronic processing apparatus, such as amplifiers, filters, and digitizers, for example, may be built into the interior of the probe housing 22. The leads 48 are extended to the sensor 42 via a bore 52 through the stop 40 and a bore 54 through the socket 34.

Figure 7:
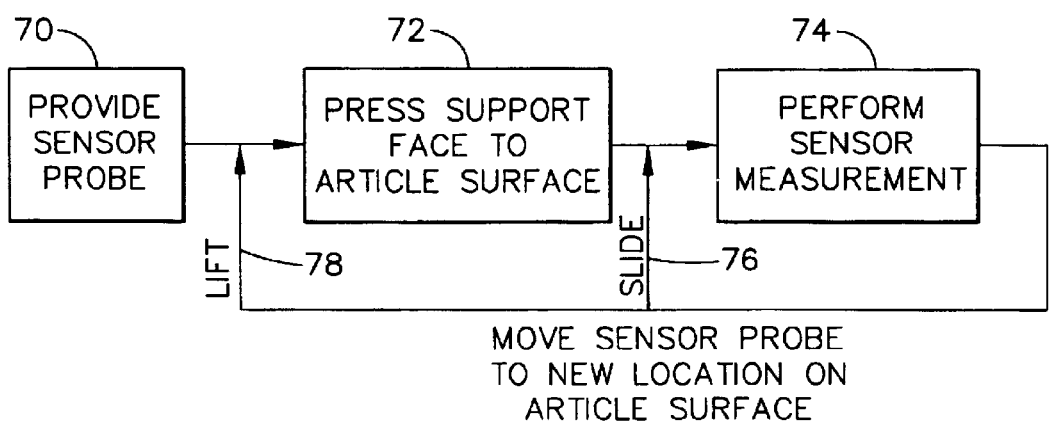
FIG. 7 is a block flow diagram of an approach for practicing the invention.

A method of practicing the invention is depicted in FIG. 7. The method includes the steps of providing a sensor probe 20, preferably a hand-held sensor probe, of the type discussed previously, numeral 70. The orienting face 28 is pressed against the surface 30 of the article 32, numeral 72, with a light contact pressure. The floating sensor support 26 maintains the orienting face 28 in intimate physical contact with the surface 30 of the article 32, so that the sensor 42 is automatically maintained in exactly the correct orientation relative to the surface 30. The sensor measurement is performed, numeral 74.

The sensor probe 20 may be used to make measurements by any operable approach. In one approach, the sensor probe 20 slides relative to the article 32, numeral 76, so that the orienting face 28 always stays in contact with the surface 30 of the article 32 and the measurements are made as the sliding movement occurs. In another approach, a discrete measurement is made with the sensor probe 20 in a first location. The sensor probe 20 is then moved to a second location on the article surface 30 by sliding the sensor probe so that the orienting face 28 stays in contact with the surface 30 of the article 32, also within the scope of numeral 76. The sensor measurement is repeated at the new location, numeral 74. In a third approach, the sensor probe 20 may be moved to a new location on the article surface 30 by lifting the sensor probe away from the article 32, so that the orienting face 28 no longer contacts the article surface 30, numeral 78, and then bringing the orienting face 28 into contact with the article surface 30 at the new location, numeral 72. The sensor measurement is repeated at the new location, numeral 74. In any of these approaches, the above-described structure ensures that the sensor 42 will be precisely positioned relative to the surface 30 of the article 32, even if the operator inadvertently changes the angle of the probe housing axis 24 relative to the article surface 30.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sensor probe operable to sense an article comprising
   a probe housing having a probe housing axis;
   a sensor support rotatably mounted in the probe housing so as to be rotatable about all directions which are perpendicular to the probe housing axis and having an orienting face defined thereon which contacts an article surface when the sensor probe is pressed against the article surface, wherein the sensor support automatically angularly reorients relative to the article surface to maintain the orienting face in contact with the article surface when the probe housing axis changes angularly relative to the article surface; and
   a sensor affixed to the sensor support and operable to sense the article through the orienting face of the sensor support.

2. The sensor probe of claim 1, wherein the orienting face is planar.

3. The sensor probe of claim 1, wherein the orienting face is curved.

4. The sensor probe of claim 1, wherein the sensor support includes a notch therein, and wherein the orienting face comprises a surface of the notch.

5. The sensor probe of claim 1, wherein the sensor support comprises a segment of a sphere having the orienting face thereon.

6. The sensor probe of claim 1, wherein the sensor support comprises a segment of a sphere having the orienting face thereon and wherein the sensor support is mounted in the probe housing in a ball-and-socket relationship.

7. The sensor probe of claim 1, wherein the sensor comprises an eddy current sensor.

8. The sensor probe of claim 1, wherein the probe housing is sized to be held in a hand of a person.

9. The sensor probe of claim 1, wherein the sensor support comprises a segment of a sphere having the orienting face thereon and wherein the sensor support is mounted in the probe housing in a ball-socket relationship, and wherein the probe housing is sized to be held in a hand of a person.

10. A hand-held sensor probe comprising:
    a hand-held probe housing;
    a sensor support comprising a segment of a sphere having an orienting face thereon, wherein the sensor support is mounted in the probe housing in a ball-and-socket relationship; and
    an eddy current sensor affixed within the sensor support and operable through the orienting face.

11. A sensor probe oriented in relation to an article surface, the sensor probe comprising:
    a substantially cylindrical probe housing having a cylindrical axis
    a sensor support rotatably mounted in the probe housing and having an orienting structure defined thereon, wherein the sensor support is rotatable about two axes perpendicular to the cylindrical axis, and wherein the orienting structure angularly orients the sensor support relative to the article surface responsive to a contact pressure between the orienting structure and the article surface; and
    a sensor affixed to the sensor support and oriented relative to the article surface responsive to the orienting structure.

12. The sensor probe of claim 11, wherein the orienting structure comprises an orienting face.

13. A method for performing a sensor measurement of an article having an article surface with an article surface shape, comprising the steps of
    providing a hand-held sensor probe comprising
       a probe housing,
       a sensor support rotatably mounted in the probe housing and having an orienting structure thereon, the orienting structure defining a shape which is substantially the article surface shape, and
       a sensor affixed to the sensor support and operable through the orienting structure of the sensor support;
    pressing the orienting structure of the sensor support against the article surface to orient the sensor support relative to the article surface; and
    performing the sensor measurement.

14. The method of claim 13, wherein step of providing the hand-held sensor probe includes the step of
    providing the probe housing having a probe housing axis, and wherein the sensor support is rotatable about at least a first rotation axis perpendicular to the probe housing axis.

15. The method of claim 13, wherein step of providing the hand-held sensor probe includes the step of
    providing the probe housing having a probe housing axis, and wherein the sensor support is rotatable about a first rotation axis perpendicular to the probe housing axis and a second rotation axis perpendicular to the probe housing axis.

16. The method of claim 13, wherein the step of providing the hand-held sensor probe includes the step of
    providing the sensor support comprising a segment of a sphere having the orienting structure thereon and wherein the sensor support is mounted in the probe housing in a ball-and-socket relationship.

17. The method of claim 13, wherein the step of providing the hand-held sensor probe includes the step of
    providing a substantially cylindrical probe housing.

18. The method of claim 13, wherein the step of providing the hand-held sensor probe includes the step of
    providing the sensor comprising an eddy current sensor.

19. The method of claim 13, wherein the step of providing the hand-held sensor probe includes the step of
  providing a substantially planar orienting face as the orienting structure.

20. The method of claim 13, wherein the step of providing the hand-held sensor probe includes the step of
  providing curved orienting face as the orienting structure.

21. The method of claim 13, wherein the step of providing includes the step of
  providing the sensor support that is rotatable about two axes, and wherein each of the two axes is perpendicular to a common axis.

22. The method of claim 13, wherein step of providing the hand-held sensor probe includes the steps of
  providing the probe housing having a probe housing axis, and wherein the sensor support is rotatable about all direction perpendicular to the probe housing axis.

* * * * *